United States Patent
Ershov et al.

(10) Patent No.: US 11,829,831 B1
(45) Date of Patent: Nov. 28, 2023

(54) ELECTRONIC SYSTEM WITH RING DEVICE

(71) Applicant: Apple Inc., Cupertino, CA (US)

(72) Inventors: Michael J Ershov, Santa Clara, CA (US); Joel N Ruscher, Fremont, CA (US); Stefan Hafeneger, Sunnyvale, CA (US); Travis J McQueen, Lee, NH (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/701,533

(22) Filed: Mar. 22, 2022

Related U.S. Application Data

(60) Provisional application No. 63/175,257, filed on Apr. 15, 2021.

(51) Int. Cl.
| | |
|---|---|
| *G06K 7/10* | (2006.01) |
| *G06K 19/077* | (2006.01) |
| *H01Q 1/22* | (2006.01) |
| *H01Q 7/00* | (2006.01) |

(52) U.S. Cl.
CPC ... *G06K 7/10297* (2013.01); *G06K 19/07762* (2013.01); *H01Q 1/2208* (2013.01); *H01Q 7/00* (2013.01)

(58) Field of Classification Search
None
See application file for complete search history.

(56) References Cited

U.S. PATENT DOCUMENTS

| | | | |
|---|---|---|---|
| 9,450,306 B1* | 9/2016 | Ebnabbasi | H01Q 7/00 |
| 9,582,034 B2 | 2/2017 | von Badinski et al. | |
| 9,696,802 B2 | 7/2017 | Priyantha et al. | |
| 10,043,125 B2* | 8/2018 | Park | H04M 1/72412 |
| 10,444,834 B2 | 10/2019 | Vescovi et al. | |
| 2011/0210931 A1 | 9/2011 | Shai | |
| 2012/0218184 A1 | 8/2012 | Wissmar | |
| 2019/0155385 A1 | 5/2019 | Lim et al. | |
| 2019/0384354 A1* | 12/2019 | von Badinski | G06F 1/163 |
| 2019/0387848 A1* | 12/2019 | Leybourn | H04B 5/0031 |

* cited by examiner

*Primary Examiner* — Kristy A Haupt
(74) *Attorney, Agent, or Firm* — Treyz Law Group, P.C.; G. Victor Treyz; Kendall P. Woodruff

(57) ABSTRACT

An electronic device such as a wearable electronic device may have a coil. The device may have a finger-ring housing that surrounds a finger-shaped opening to allow the device to be worn on a finger of a user. The coil may be formed from metal traces on a printed circuit that wrap around the finger-shaped opening. Near-field communications circuitry in the device may be used to gather near-field communications tag information. The tag information may be gathered in response to user input. Wireless communications circuitry that uses a non-near-field communications antenna may wirelessly transmit the tag information and/or other information such as user input to a companion device.

23 Claims, 7 Drawing Sheets

ELECTRONIC SYSTEM WITH RING DEVICE

This application claims the benefit of provisional patent application No. 63/175,257, filed Apr. 15, 2021, which is hereby incorporated by reference herein in its entirety.

FIELD

This relates generally to electronic devices, and, more particularly, to electronic device systems with controllers.

BACKGROUND

Electronic devices sometimes have displays and other output devices. These output devices may provide content to a user. In some systems, electronic devices serve as controllers that allow a user to interact with visual content. A controller device may, for example, detect body movements that are used in manipulating items on a display in another device.

If care is not taken, devices serving as controllers may not be ergonomic or may not perform as expected. Such devices may also be incapable of operating as stand-alone equipment.

SUMMARY

An electronic device such as a wearable electronic device may be used in a system of devices. The wearable electronic device may be a ring device having a finger-ring housing that surrounds a finger-shaped opening. The finger-ring housing allows the device to be worn on a finger of a user.

A ring device may have a coil. The coil may be formed from metal traces on a printed circuit having an elongated strip shape that wraps around the finger-shaped opening. Opposing ends of the printed circuit may be electrically connected so that the metal traces form a continuous spiral path for the coil with a desired number of turns.

The ring device may have near-field communications circuitry. The near-field communications circuitry may use the coil to transmit and/or receive any suitable near-field communications signals. For example, the near-field communications circuitry may use the coil to gather near-field communications tag information from a near-field communications tag, may use the coil to emulate a tag, and/or may otherwise support bidirectional operations (e.g., reading and/or writing operations). If desired, tag information may be gathered in response to user input such as a device tap or shake that is detected with an accelerometer or other sensor.

The ring device may have wireless communications circuitry that uses a non-near-field communications antenna to wirelessly transmit the tag information and/or other information to a companion device. If desired, wireless power circuitry, magnetic sensor circuitry, and/or other circuitry may be coupled to the coil in addition to the near-field communications circuitry.

DETAILED DESCRIPTION

A system may include one or more electronic devices that interact with each other. As an example, the system may have a first device that can gather user input and may have a second device that can be controlled by the first device. The first and second device may also be operated independently, if desired. In an illustrative configuration, the first device in this type of system may be a ring device (sometimes referred to as a controller, ring controller, body-mounted device, etc.). The ring device may have a ring shape that allows the ring device to be worn on a body part of a user (e.g., around a user's wrist, arm, leg, ankle, neck, head, and/or other body part). In an illustrative configuration, which may sometimes be described herein as an example, the ring device has a finger-ring housing that is configured to be worn on a user's finger.

The second device in this type of system may be a portable electronic device such as a cellular telephone, tablet computer, laptop computer, head-mounted device, or other electronic equipment (e.g., a desktop computer, a television, etc.). Because the second device may be operated by a user in conjunction with the first device, the second device may sometimes be referred to as a companion device.

Use of a ring device may facilitate the gathering of user input. During operation of a companion device, a user may wish to supply user input to the companion device in the form of hand gestures, pointing input, or other user input involving the position of the use's body (e.g., the location, orientation, and movement of one or more fingers and/or other body parts). The ring device may have sensors such as inertial measurement units and/or other sensors that allow such body-based input to be gathered. Because a ring device may be worn throughout the day, a ring device will generally be immediately available to the user, unlike devices that are stored in a user's pocket or more distant locations. This facilitates interactions between the ring device and objects in the user's environment. For example, a ring device can easily be brought into close proximity with near-field communications tags in the user's environment.

Figure 1:
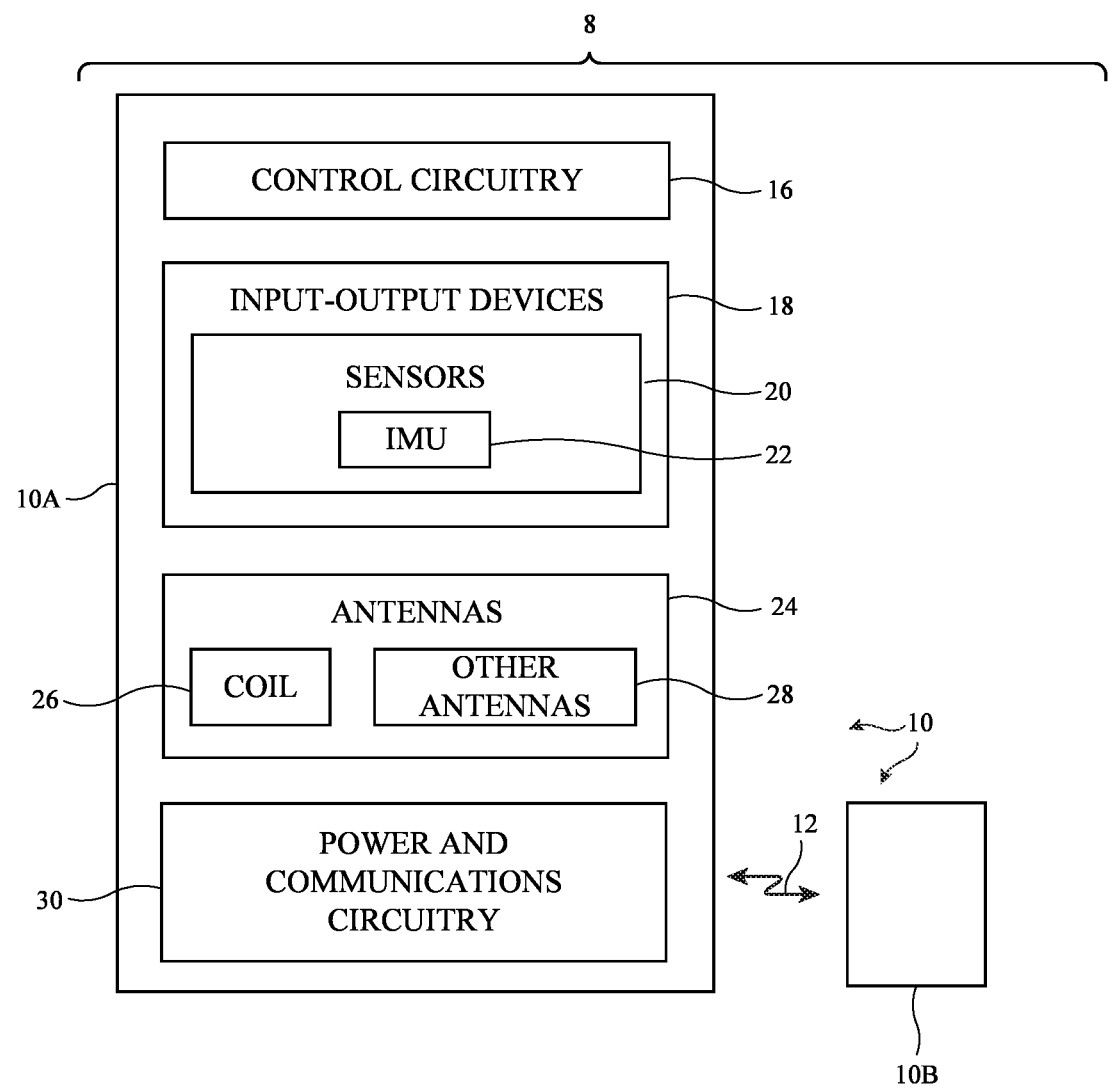
FIG. 1 is a schematic diagram of an illustrative system with electronic devices in accordance with an embodiment.

An illustrative system that includes a ring device is shown in FIG. 1. As shown in FIG. 1, system 8 may include multiple electronic devices 10 such as ring device 10A and companion device 10B. Devices 10A and 10B may communicate wirelessly, as shown by wireless signals 12. For example, device 10A may gather user input and this user input may be wirelessly conveyed to device 10B to use in controlling objects presented on a display (e.g., by moving pointers, selecting and moving visual items, making menu selections, etc.), to adjust audio playback, to change settings, and/or to otherwise control the operation of device 10B.

Electronic devices 10 may include computing devices such as laptop computers, computer monitors containing an embedded computers (e.g., desktop computers formed from displays with desktop stands that have computer components embedded in the same housings as the displays), tablet computers, cellular telephones, media players, or other handheld or portable electronic devices, smaller devices such as wrist-watch devices, pendant devices, headphone or earpiece devices, devices embedded in eyeglasses or other equipment worn on a user's head (e.g., helmets, goggles, hats, glasses, or other head-mounted devices), finger-mounted devices such as rings (e.g., finger rings), gloves, wristband devices, armband devices, or other wearable or miniature devices, televisions, computer displays that do not contain embedded computers, gaming devices, navigation devices, tower computers, embedded systems such as systems in which electronic equipment is mounted in kiosks or automobiles, equipment that implements the functionality of two or more of these devices, or other electronic equipment. In an illustrative configuration, device 10A is a ring device (e.g., a ring mounted on a user's finger) and device 10B is a companion device with a display and other components that may be adjusted using user input and other input that is gathered by the ring device. In general, devices 10A and 10B may have the same components, or some of the components of device 10A may not be present in device 10B and/or some of the components of device 10B may not be present in device 10A (e.g., due to space constraints).

As shown in FIG. 1, device 10A may have control circuitry 16. Control circuitry 16 may include storage and processing circuitry for supporting the operation of device 10A. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10A. The processing circuitry may be based on one or more microprocessors, microcontrollers, digital signal processors, baseband processors, power management units, audio chips, application specific integrated circuits, etc.

Device 10A may include wired and/or wireless communications circuitry and may include wireless power circuitry. For example, device 10A may have power and communications circuitry 30. Circuitry 30, which may be considered to form part of control circuitry 16, may include near-field communications circuitry and may include radio-frequency transceiver circuitry such as cellular telephone communications circuitry, wireless local area network communications circuitry, short distance wireless communications circuitry such as Bluetooth® circuitry and/or other wireless radio-frequency transceiver circuitry (sometimes referred to as non-near-field communications circuitry). Circuitry 30 may also include wireless power circuitry.

Power and communications circuitry 30 may use antennas 24 to send and receive wireless signals such as wireless power signals and wireless communications signals (e.g., wireless data). Antennas 24 may include one or more coils such as coil 26 (sometimes referred to as coil antennas, near-field communications antennas, inductive coils, etc.) and may include other antennas 28 (e.g., antennas such as inverted-F antennas, planar inverted-F antennas, slot antennas, patch antennas, and/or other antennas). Antennas 28 may sometimes be referred to as non-near-field communications antennas.

Circuitry 30 may use coil 26 to transmit and/or receive near-field signals at 13.56 MHz and/or other suitable near-field communications frequencies. These near-field signals may by conveyed between device 10A and device 10B when devices 10A and 10B are separated by relatively modest distances (e.g., distances of less than 20 cm, or other limited distance associated with near-field electromagnetic signals). These limited-range wireless communications may sometimes be referred to as near-field communications and take place when coil 26 is near-field coupled to a corresponding coil in device 10B.

Coil 26 may also be used in receiving and/or transmitting wireless power. For example, coil 26 may be used to receive alternating-current wireless power signals from a wireless charging puck or mat in the vicinity of device 10A. Device 10A may use a rectifier in the wireless power circuitry of circuitry 30 to convert received alternating-current signals from coil 26 into direct-current power for operating device 10A.

Wireless communications using antennas 28 may use radio-frequency signals in frequency bands of at least 100 MHz, at least 1 GHz, less than 100 GHz, and/or other frequencies). These wireless communications may take place over larger distances than near-field communications using coil 26. For example, non-near-field wireless communications using non-near-field antennas may take place over distances of at least 20 cm, at least 100 cm, less than 50 m, 1-50 m, and/or other suitable non-near-field communications distances).

The communications circuitry of device 10A may allow device 10A to communicate (transmit and/or receive data) with other electronic devices such as device 10B. For example, control circuitry 16 (e.g., communications circuitry 30 and/or other control and communications circuitry in device 10A) may be used to allow wired and/or wireless control commands and other communications to be conveyed between device 10A and other equipment in system 8 such as cellular telephones, tablet computers, laptop computers, desktop computers, head-mounted devices, handheld controllers, finger devices, wristwatch devices, other wearable devices, keyboards, computer mice, remote controls, speakers, accessory displays, accessory cameras, and/or other electronic devices.

Input-output circuitry in device 10A such as input-output devices 18 may be used to allow data to be supplied to device 10A and to allow data to be provided from device 10A to external devices such as device 10B. Input-output devices 18 may include input devices that gather user input and other input and may include output devices that supply visual output, audible output, or other output.

Input-output devices 12 may include sensors 20. Sensors 20 may include one or more sensors for detecting position, orientation, and/or motion (e.g., accelerometers, magnetic sensors such as compass sensors, gyroscopes, and/or inertial measurement units such as inertial measurement unit 22 that contain some or all of these sensors). These sensors may sometimes be referred to as position sensors and may be used in monitoring the location of device 10A, the orientation of device 10A, and/or the motion of device 10A so that these measurements may be used, for example, as user input that is wirelessly conveyed to device 10B.

If desired, sensors 20 may include other sensor circuitry such as force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping display, and/or a touch sensor or force sensor that forms a button, trackpad, or other input device not associated with a display), and other sensors. Touch sensors may be based on an array of capacitive touch sensor electrodes, acoustic touch sensor structures, resistive touch components, force-based touch sensor structures, a light-based touch sensor, or other suitable touch sensor arrangements. In some configurations, device 10A may have a force sensor for gathering force input (e.g., a two-dimensional force sensor may be used in gathering force input). If desired, sensors 20 may include optical sensors such as optical sensors that emit and detect light, ultrasonic sensors, optical touch sensors, optical proximity sensors, and/or other touch sensors and/or proximity sensors, monochromatic and color ambient light sensors, visible light image sensors, infrared image sensors (e.g., thermal image sensors), fingerprint sensors, temperature sensors (e.g., thermal sensors that sense contact by fingers and other user body parts by measuring temperature changes), sensors for measuring three-dimensional non-contact gestures ("air gestures"), pressure sensors, health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

Device 10A may include other input-output devices 18. These other devices may include, mechanical devices for gathering input such as buttons, joysticks, scrolling wheels, key pads, keyboards, and other devices for gathering user input. During operation, device 10A may use sensors 20 and/or other input-output devices to gather user input (e.g., buttons may be used to gather button press input, touch and/or force sensors overlapping displays can be used for gathering user touch screen input and/or force input, touch pads and/or force sensor may be used in gathering touch and/or force input, microphones may be used for gathering audio input, etc.). Input-output devices may include output devices such as haptic output devices, speakers or other devices for providing audio output, status indicators, displays, and other visual output devices, and/or other input-output circuitry. If desired, device 10A may include additional components. These additional components may include, for example, a battery or other energy storage device, connector ports for supporting wired communications with ancillary equipment and for receiving wired power, and other circuitry.

Figure 2:
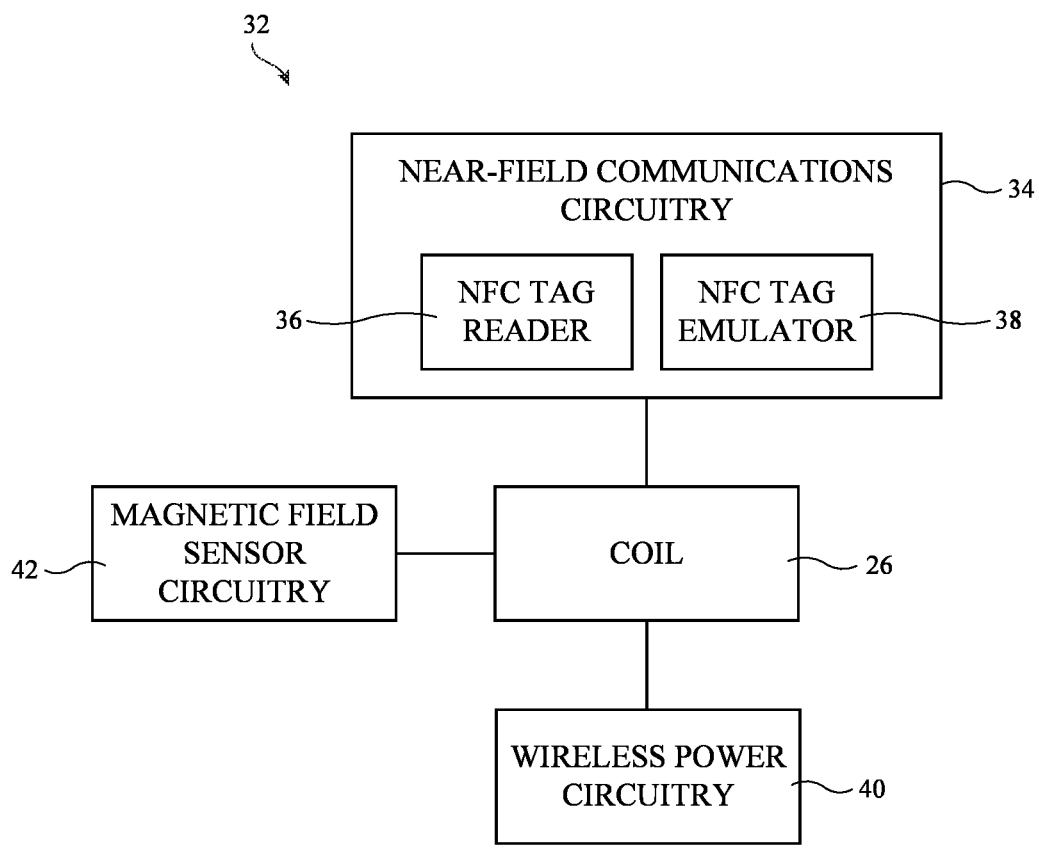
FIG. 2 is a circuit diagram of illustrative circuitry for a ring device in accordance with an embodiment.

FIG. 2 is a circuit diagram of illustrative wireless circuitry 32 in device 10A (e.g., circuitry included in circuitry 16 and/or circuitry 30) that may be used to transmit and/or receive wireless signals with one or more coils such as coil 26. As shown in FIG. 2, circuitry 32 may include near-field communications circuitry 34. Circuitry 34 may transmit and/or receive near-field communications signals with coil 26 using any suitable near-field communications protocol. In an illustrative configuration, circuitry 34 includes a near-field communications tag reader (NFC reader circuit 36) and a near-field communications tag emulator (NFC tag circuit 38). Circuits 36 and 38 communicate using radio-frequency identification (RFID) near-field communications protocols. Other near-field communications protocols may be used with circuitry 32, if desired.

Wireless power circuitry 40 may include a wireless power transmitter (e.g., an inverter that is coupled to coil 26 and that drives alternating-current drive signals through coil 26 to cause coil 26 to emit wireless power signals) and/or may include a wireless power receiver (e.g., a rectifier that is coupled to coil 26 and that rectifies alternating-current signals that are received by coil 26 from a wireless power transmitter). Direct-current power that is produced by rectifying the received alternating-current signals from coil 26 may be used in powering the components of device 10A and/or may be used in charging a power storage device in device 10A such as a battery. Circuitry 34 and circuitry 40 may be coupled to a shared coil (e.g., both of these circuits may share coil 26 of FIG. 2) or circuitry 34 and circuitry 40 may be provided with separate respective coils. Coil sharing arrangements may help reduce the size and weight of device 10A.

In an illustrative arrangement, circuitry 32 may also include magnetic sensor circuitry. Circuitry 32 may, as an example, include magnetic sensor circuitry 42 that measures magnetic fields that have been received using coil 26. The magnetic fields that are sensed in this way may be produced as reference magnetic fields by device 10B (e.g., so that circuitry 42 can sense the position of device 10A relative to this reference magnetic field). Circuitry 42 may be coupled to coil 26 (e.g., a coil shared with circuitry 34 and/or circuitry 40) and/or may be coupled to one or more separate coils. Multiple orthogonal coils (e.g., three orthogonal coils which may or may not include coil 26) may be coupled to circuitry 42 to help provide circuitry 42 with magnetic field strength information in three dimensions. In some illustrative arrangements, circuitry 42 may energize coil 26 (e.g., so that device 10B can sense reference fields produced by device 10A in addition to or instead of allowing device 10A to measure the position of device 10A relative to device 10B by analyzing reference fields received by device 10A from device 10B).

In addition to or instead of using one or more coils such as coil 26 for position sensing operations in which magnetic fields are measured, device 10 may include other circuitry for measuring position. Position sensing circuitry may be used to measure the orientation of device 10 (e.g., the amount of rotation of device 10 about each of the X, Y, and Z axes), the location of device 10 (e.g., in X, Y, and Z), and may be used to measure orientation and location changes (e.g., the position sensing circuitry may be used to detect translational motion and/or rotational motion). The position sensing circuitry may be based on one or more inertial measurement units (e.g., sensors that include accelerometers, compasses, and/or gyroscopes) and/or may include other position sensing technologies such as visual inertial odometry (VIO) sensors or other position sensors that operate at least partly using light and/or radio-frequency sensors such as ultra-wideband (UWB) sensors that use short range broad spectrum radio-frequency waves at gigahertz frequencies to determine the position of device 10 by interacting with other UWB equipment in the vicinity of device 10, etc.).

Figure 3:
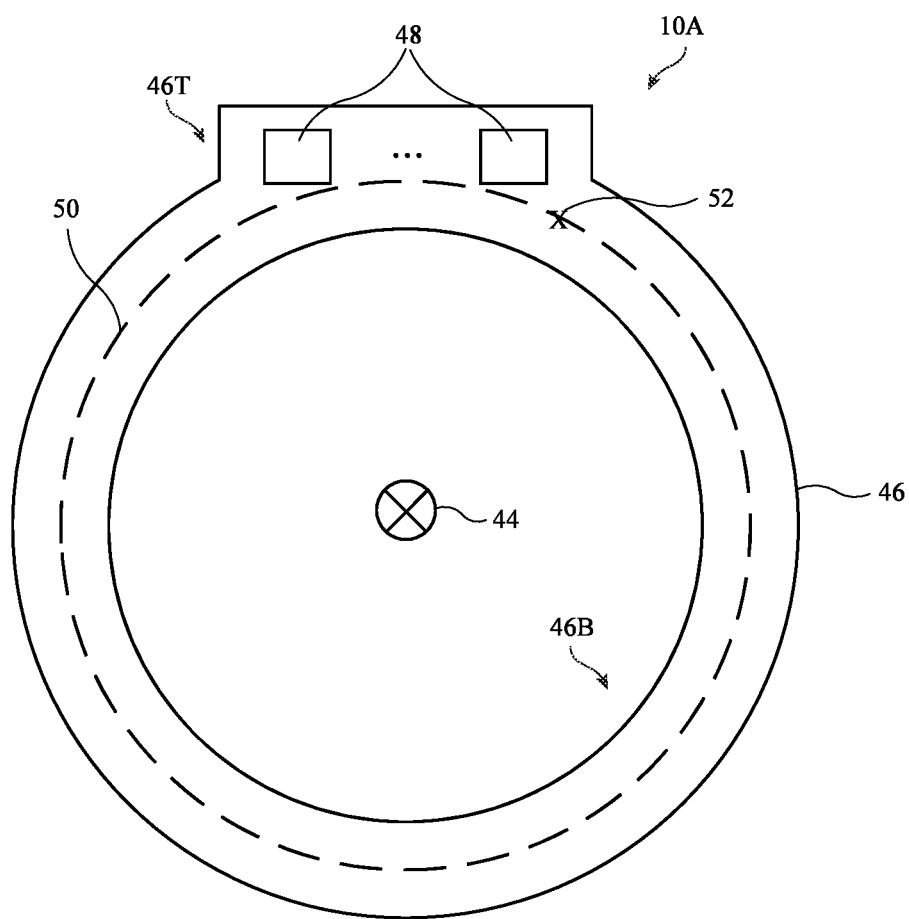
FIG. 3 is a side view of an illustrative ring device in accordance with an embodiment.

FIG. 3 is a front side view of device 10A (e.g., a view of device 10A taken along axis 44, which runs into the page in the orientation of FIG. 3 and which is aligned with the longitudinal axis of a user's finger when device 10A is worn with on the user's finger). As shown in FIG. 3, device 10A may include components 48 that are interconnected by signal paths 50. Signal paths 50 may be formed on one or more printed circuits (e.g., rigid printed circuits formed from rigid printed circuit board material, flexible printed circuits formed from flexible sheets of polyimide or other bendable polymer layers, and/or printed circuits that include both rigid and flexible areas, sometime referred to as rigid flex circuits) and/or one or more other dielectric members that serve as substrates (e.g., members formed from polymer, glass, ceramic, etc.) that are shaped using three-dimensional printing (e.g., to form a three-dimensional substrate of the type sometimes referred to as a three-dimensional printed circuit board), molding, machining, and/or other fabrication techniques. The substrate for signal paths may, in some embodiments, be formed from portions of a dielectric housing for device 10.

Signal paths 50 may include metal traces patterned to form multiple turns for coil 26. Vires, traces on laser-direct structuring substrates, metal members formed by stamping, machining, and/or other fabrication techniques, and/or other conductive structures in device 10A may also be used in forming paths 50, if desired. In an illustrative arrangement, the signals lines that form the turns of coil 26 extend in a ring within ring-shaped housing 46 (e.g., coil 26 is formed from signal paths that wrap around the finger-shaped opening in the center of device 10A and that therefore wrap around a user's finger). Printed circuit(s) on which signal paths 50 for coil 26 are formed may have an elongated shape (e.g., the shape of an elongated strip that is bent into a ring). This elongated printed circuit may have opposing first and second ends that are connected to each other using connections 52 so that the turns of coil 26 extend in a continuous spiral around the user's finger. A pair of terminals at the ends of coil 26 may be coupled to circuitry such as near-field communications circuitry 34, wireless power circuitry 40, and/or magnetic field sensor circuitry 42 (see, e.g., FIG. 2). Connections 52 may include conductive joints (solder, connections, connections formed by contacts in connectors, conductive adhesive connections, welds, etc.). These conductive joints may join the metal traces or other signal paths (e.g., wires, etc.) to form the turns of coil 26. If desired, a conductive housing structure for device 10 such as some or all of ring-shaped metal housing may be configured to form one or more of the turns of coil 26 (e.g., housing 46 may form some or all of signal paths 50). As an example, housing 46 may be formed from a spiral metal member with interlocking polymer or other dielectric for structural support. In this configuration, the spiral metal member may form multiple turns for coil 26. Arrangements in which a metal ring-shaped housing for device 10 forms a single-turn coil may also be used, if desired. If desired, slots for forming slot antennas, and/or other antenna structures (e.g., inverted-F antennas, patch antennas, etc.) may be formed from conductive portions of device 10 such as metal portions of housing 46. As an example, housing 46 may include a metal ring and a slot antenna may be formed from a slot-shaped opening in the ring.

Components 48 may include integrated circuits, discrete components, sensors, and/or other circuitry (see, e.g., control circuitry 16, input-output devices 18, antennas 24, and power and communications circuitry 30). Components 48 may be mounted on the same printed circuit that is used to form coil 26 or may be mounted on one or more different printed circuits (e.g., using solder, etc.).

Device 10A may have a housing that is configured to be worn on a user's finger such as finger-ring housing 46. Components 48 and signal paths 50 may be mounted in housing 46 (e.g., in an interior portion of housing 46 that is separated from the exterior environment surrounding housing 46 by housing walls and/or other housing structures). Housing 46 may have any suitable shape. For example, the housing may be configured to form a circular or oval ring with a central finger-shaped opening that is configured to receive the finger of a user and may or may not have optional protrusions such as top protrusion 46T that protrude from a non-protruding ring-shaped portion of housing 46 such as lower ring-shaped portion 46B. Housing structures for housing 46 (e.g., housing walls, internal support structures, etc.) may be formed from polymer, metal, glass, fabric, crystalline materials such as sapphire, other materials, and/or combinations of these materials. Electrical components 48 (e.g., control circuitry, input-output devices, etc.) may be mounted in an interior portion of housing 46, may be embedded within housing wall structures, and/or may include structures mounted on exterior surfaces or near exterior surfaces of housing 46. In some configurations, electrical components 48 may operate through housing windows that exhibit radio-frequency transparency and/or that exhibit optical transparency. In other configurations, portions of housing 46 (e.g., ring-shaped portion 46B and/or protruding portion 46T) may be formed from materials that are compatible with the operation of components 48. For example, portion 46B and/or 46T may be formed partly or completely from dielectric to reduce potential interactions between metal structures and the wireless operations of device 10A.

Figure 4:
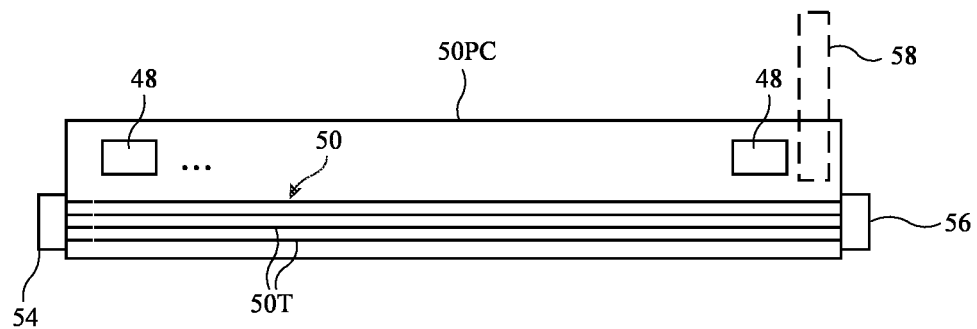
FIG. 4 is a top view of an illustrative printed circuit in accordance with an embodiment.

FIG. 4 is a top view of an illustrative printed circuit having metal traces for forming coil 26. As shown in FIG. 4, printed circuit 50PC may have an elongated strip shape with a series of elongated parallel metal traces 50T that run along the length of the strip. Metal traces 50T form respective turns in coil 26 when joined at their ends to form a spiral path. Coil 26 may have one turn, two turns, at least five turns, 5-50 turns, 10 turns, fewer than 25 turns, or other suitable number of turns. Metal traces 50T in coil 26 may have widths of 50-200 microns, at least 15 microns, at least 25 microns, at least 30 microns, less than 700 microns, less than 500 microns, 30-500 microns, 15-700 microns, or other suitable widths and thicknesses of 5-20 microns, at least 10 microns, at least 30 microns, 5-100 microns, 5-50 microns, less than 100 microns, less than 60 microns, less than 50 microns, or other suitable thicknesses. End connections may be formed using mating connectors 54 and 56 or other connections (see, e.g., connections 52 of FIG. 3). Components 48 (e.g., integrated circuits, etc.) may be mounted on printed circuit 50PC as shown in FIG. 4 and/or may be mounted on other printed circuits. For example, one or more of components 48 may be mounted on a printed circuit such as printed circuit 58 that is connected to printed circuit 50PC.

Figure 5:
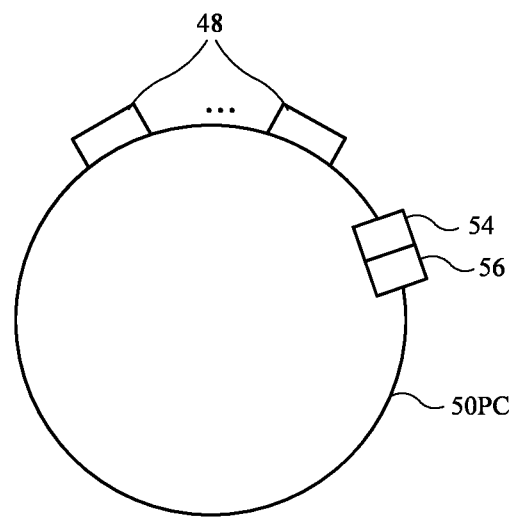
FIG. 5 is a side view of an illustrative printed circuit with joined ends for forming a coil for a ring device in accordance with an embodiment.

As shown in FIG. 5, when printed circuit 50PC is wrapped into a loop so that connectors 54 and 56 at the opposing ends of strip-shaped printed circuit 50PC mate with each other, paths 50 are configured to form a spiral signal path with a desired number of turns for coil 26.

Figure 6:
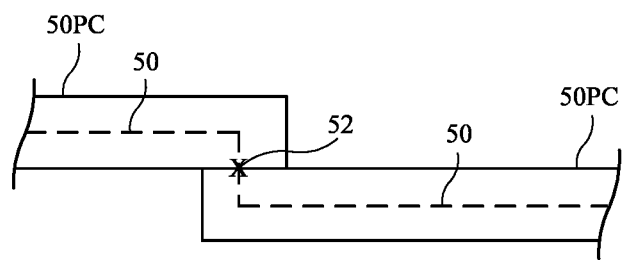
FIG. 6 is a side view of an illustrative printed circuit with overlapping ends joined with electrical connections in accordance with an embodiment.

Connectors 54 and 56 may be, for example, printed circuit connectors that mate with each other in an end-to-end fashion (e.g., zero insertion force connectors). Other types of electrical connection may be used to join paths 50 to form coil 26, if desired. As shown in the side view of FIG. 6, for example, signal paths 50 at the ends of printed circuit 50PC may be connected with connections 52 that accommodate overlapping printed circuit ends (e.g., board-to-board connectors, solder joints (e.g., solder connections formed using hot bar reflow techniques), anisotropic conductive film joints or other conductive adhesive connections, etc.

Figure 7:
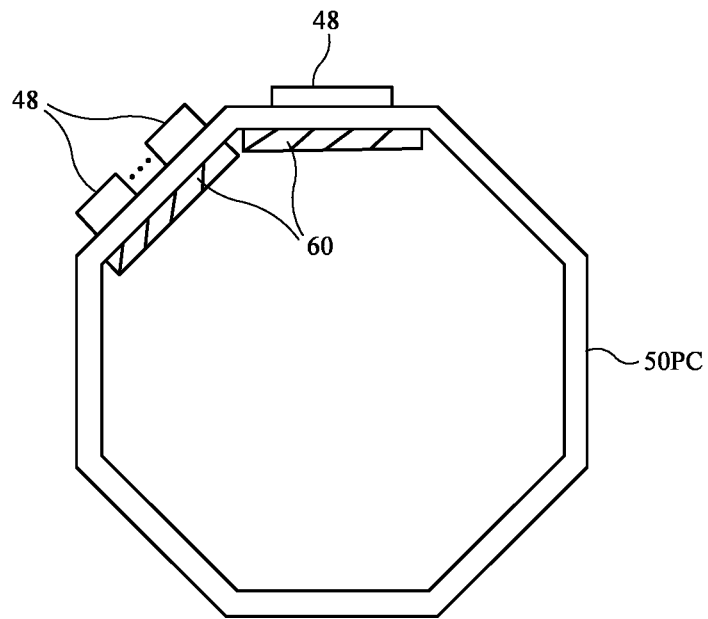
FIG. 7 is a side view of an illustrative ring-shaped printed circuit with stiffeners and an octagonal cross-sectional profile in accordance with an embodiment.

FIG. 7 is a side view of printed circuit 50PC in an illustrative configuration in which the ring shape of printed circuit 50PC has been provided with multiple planar portions. There may be, for example, eight flat segments of printed circuit 50PC, so that printed circuit 50PC has an octagonal cross-sectional profile. In general, there may be any suitable number of flat areas around the periphery of ring-shaped printed circuit structure in device 10A (e.g., none, at least one, at least three, at least five, at least eight, eight, fewer than ten, seven to nine, etc.). The arrangement of FIG. 7 in which components 48 are mounted on at least two of eight planar portions of a ring-shaped printed circuit is illustrative.

Figure 8:
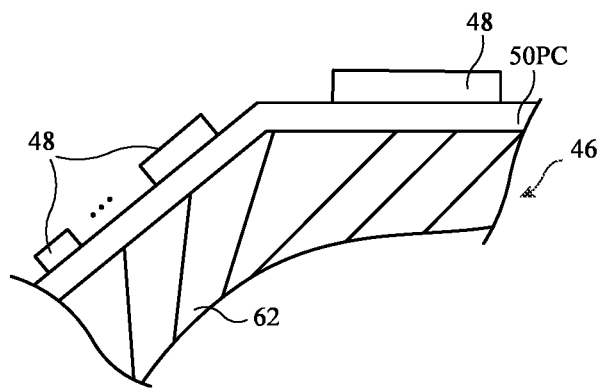
FIG. 8 is a side view of a portion of a ring housing member that is being used as a stiffener for a printed circuit in accordance with an embodiment.
Figure 9:
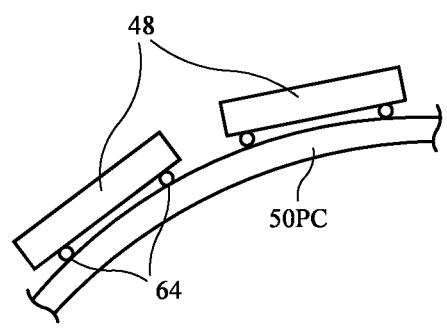
FIG. 9 is a side view of a portion of a printed circuit without stiffeners in accordance with an embodiment.

The flat areas of printed circuit 50PC may facilitate the reliable mounting of components 48 (e.g., integrated circuits may be mounted to contacts formed from metal traces in the flat areas of printed circuit 50PC using solder or other conductive connections without experiencing undesired stress due to bending of printed circuit 50PC). If desired, some or all of the flat areas may be strengthened by planar stiffeners such as stiffeners 60 (e.g., stiff plates of polymer, stiff sheet metal members, and/or other stiffening members that at attached with adhesive to an opposing surface of printed circuit 50PC to help prevent undesired bending in printed circuit 50PC). FIG. 8 shows how portions of housing 46 (e.g., an inner ring portion 62 of portion 46B of housing 46) may be provided with planar support areas that can serve as stiffeners for printed circuit 50PC. FIG. 9 shows how, in some configurations, stiffeners can be omitted, so that components 48 can be soldered (e.g., with solder joints 64) or otherwise mounted to printed circuit 50PC without additional stiffening. If desired, printed circuit 50PC may have stiff planar segments formed from rigid printed circuit board material that are joined by intervening flexible printed circuit material (e.g., printed circuit 50PC may be a rigid flex printed circuit). A combination of these approaches and/or other approaches may be used for providing printed circuit 50PC with mounting areas for components 48, if desired.

Figure 10:
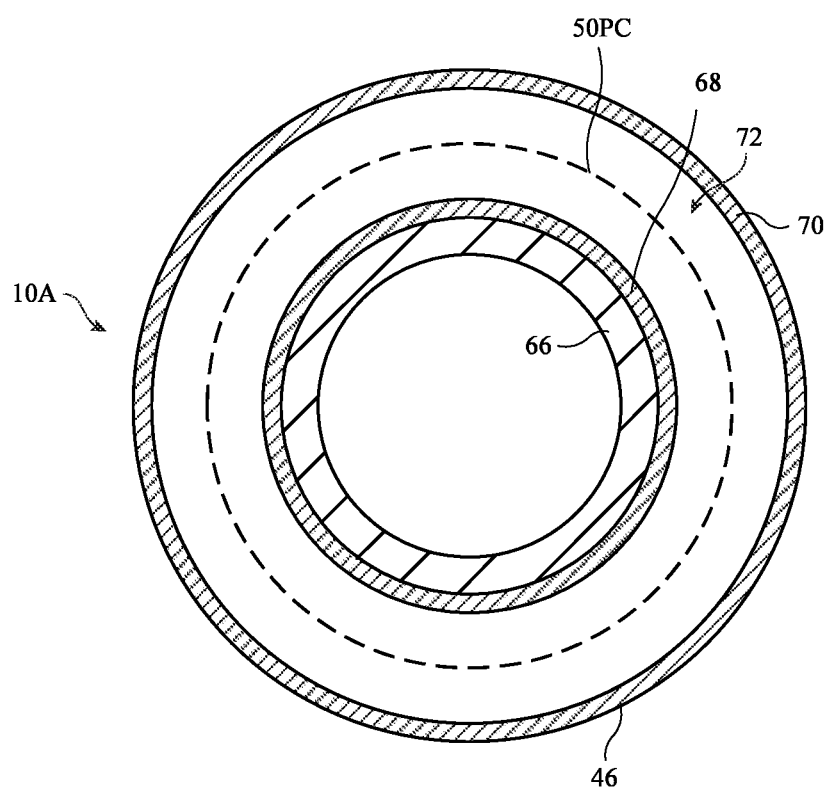
FIG. 10 is a cross-sectional side view of an illustrative ring device in accordance with an embodiment.

FIG. 10 shows how housing 46 may have an inner portion such as inner ring portion 66. Outer housing structures (e.g., an outer housing ring having walls 68 and 70 surrounding interior region 72) may be formed on inner ring portion 66. Printed circuit 50PC (and coil 26, which may be formed from looped metal traces in signal paths 50 on printed circuit 50PC) may be enclosed in interior region 72. As an example, inner ring portion 66 may be formed from polymer, other dielectric materials, or metal and the housing walls of the outer ring portions may be formed from dielectric (e.g., polymer, glass, and/or other materials that are radio-transparent and therefore allow wireless signals 12 to be conveyed to and from coil 26 in the outer housing portion).

During operation, device 10A may be used in sensing the environment surrounding device 10A and/or may be used in gathering position information (e.g., information on the orientation, location, and/or motion of device 10A). For example, an inertial measurement unit or other position sensor may monitor the position of device 10A. Magnetic sensing circuitry 42 and/or other sensors (e.g., optical sensors on device 10A) may also be used in gathering information on the position of device 10A. Position information that is sensed in device 10A and other input gathered by sensors 20 (e.g., button press input, touch sensor input, force sensor input, etc.) may be wirelessly transmitted to device 10B to serve as control input. If desired, device 10B may use cameras, magnetic sensing circuitry, and/or other sensors to track the position of device 10A. Using sensing circuitry in device 10A and/or sensing circuitry in device 10B in this way, a user may move device 10A, may point device 10A, and/or may otherwise provide user input to device 10A and system 8 to control device 10B by positioning device 10A appropriately (e.g., by moving device 10A in an air gesture, by moving device 10A while device 10A is being tracked in a virtual reality or mixed reality environment created by device 10B, etc.).

In some configurations, an accelerometer or other sensor in device 10A can detect when device 10A taps against an external object and/or shakes device 10A. Taps or shakes or other user input may be used, for example, to invoke near-field communications reader functions and/or other near-field circuit operations that can be used in gathering near-field communications information (e.g., NFC tag information) from NFC tags in the user's environment. This tag information can then be provided from device 10A to device 10B (e.g., using non-near-field communications such as Bluetooth® communications or other short-range wireless communications and/or using near-field communications).

Consider, as an example, a scenario in which a user is walking through a building. The user views an item on a shelf that contains an NFC tag with information about the item. Illustrative operations associated with interacting with the NFC tag using device 10A in this type of scenario are shown in the flow chart of FIG. 11.

Initially, device 10A uses sensors 20 to monitor for user input that triggers an NFC reader operation (see, e.g., the operations of block 74). This monitoring operation may, as an example, involve using an accelerometer to monitor for taps (e.g., contact between housing 46 and an external object such as the item on the shelf that the user is viewing) or shakes. To express interest in receiving tag information from the item, the user may tap device 10A against the shelf in the vicinity of the item (and within near-field communications range of the NFC tag) or may shake device 10A in the vicinity of the NFC tag.

In response to detecting a tap, shake, or other activity initiating an NFC reading operation, device 10A (e.g., control circuitry 16) may use NFC reader 36 of FIG. 2 to read the NFC tag (see, e.g., the operations of block 76). During this process, device 10A uses NFC tag reader 36 to read the NFC tag and thereby obtain an item identifier and/or other NFC tag information associated with the item of interest.

After the tap or shake, the user may move device 10A away from the item. During the operations of block 78, control circuitry 16 may use wireless communications circuitry 30 to wirelessly convey the tag information that has been obtained (e.g., the name of the item, information about the manufacturer associated with the item, an identifier for the item, etc.) to device 10B. In an illustrative configuration, device 10A uses non-near-field wireless communications to provide the tag information to device 10B.

Device 10B may then take suitable action during the operations of block 80. As an example, device 10B may retrieve a web page or other information over the internet using a universal resource locator (URL) or other resource locator embedded in or associated with the identifier and/or other NFC tag information. Device 10B may also retrieve locally stored information associated with the NFC tag. The information associated with the identifier and/or other NFC tag information that is obtained by device 10B may be presented to the user with the output devices of device 10B (e.g., by displaying this information in the form of a label, an image, or other visual content on a display in device 10B that can be viewed by the user, by presenting audio information using a speaker in device 10B, by playing video related to the tag, etc.).

Figure 11:
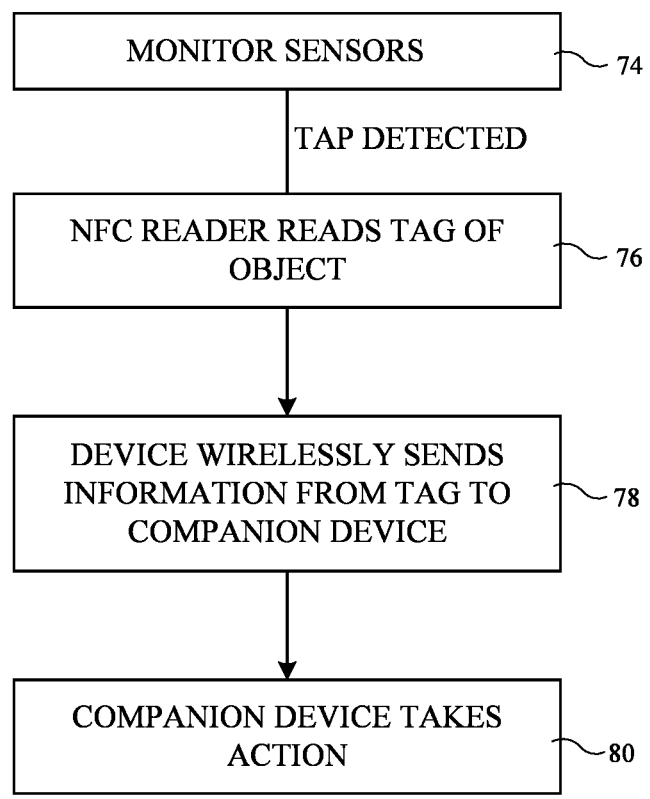
FIG. 11 is a flow chart of illustrative operations associated with operating a ring device in a system in accordance with an embodiment.

Other types of near-field interactions may be performed using device 10A, if desired. For example, device 10A may exchange information with peer devices using near-field communications (or other wireless communications such as Bluetooth® communications), may upload information to the internet over a wireless connection with a wireless access point, cellular telephone network, or other wireless network, etc. The tag reading operations of FIG. 11 are illustrative. Moreover, it is not necessary for a user to tap or shake device 10A in order to initiate data gathering with near-field communications circuitry in device 10A. If desired, device 10A may monitor the environment for near-field communications broadcasts, wireless beacons, bar codes, and/or other markers of available NFC tag information and may, in response to recognizing such as marker, automatically interact with nearby near-field communications tags.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A ring device operable to wirelessly communicate with a companion device, comprising:
a finger-ring housing having a finger-shaped opening;
a coil that has a ring shape that wraps around the finger-shaped opening; and
control circuitry configured to transmit wireless information to the companion device, wherein the control circuitry includes near-field communications circuitry with a near-field communications reader.

2. The ring device defined in claim 1 further comprising a sensor configured to gather user input, wherein the control circuitry is configured to use the near-field communications reader and the coil to obtain tag information from a near-field communications tag in response to the user input.

3. The ring device defined in claim 2 wherein the sensor comprises an accelerometer and wherein the user input comprises movement of the finger-ring housing detected with the accelerometer.

4. The ring device defined in claim 2 further comprising a printed circuit in the finger-ring housing, wherein the coil comprises turns formed from metal traces on the printed circuit.

5. The ring device defined in claim 4 wherein the printed circuit has a planar area.

6. The ring device defined in claim 5 further comprising components soldered to the planar area of the printed circuit.

7. The ring device defined in claim 6 further comprising a stiffener attached to the printed circuit in the planar area.

8. The ring device defined in claim 6 wherein the finger-ring housing has a planar portion that supports the planar area of the printed circuit.

9. The ring device defined in claim 4 wherein the printed circuit has an elongated strip shape that wraps around the finger-shaped opening, wherein the printed circuit has first and second opposing ends, and wherein the metal traces at the first and second opposing ends are joined by connections.

10. The ring device defined in claim 9 wherein the connections comprise printed circuit connectors.

11. The ring device defined in claim 9 wherein the connections comprise connections selected from the group consisting of: solder connections and conductive adhesive connections.

12. The ring device defined in claim 4 wherein the printed circuit has a ring-shaped cross-sectional profile with at least two straight segments.

13. The ring device defined in claim 4 wherein the printed circuit has an octagonal cross-sectional profile.

14. The ring device defined in claim 1 wherein the finger-ring housing has a metal inner ring portion and a dielectric outer ring portion.

15. The ring device defined in claim 14 wherein the coil is in the dielectric outer ring portion.

16. The ring device defined in claim 1 wherein the control circuitry comprises magnetic field sensor circuitry coupled to the coil.

17. The ring device defined in claim 1 wherein the control circuitry comprises wireless power circuitry coupled to the coil, wherein the wireless power circuitry has a rectifier configured to convert alternating-current signals from the coil into direct-current power.

18. The ring device defined in claim 1 further comprising a non-near-field communications antenna, wherein the control circuitry is configured to transmit the wireless information to the companion device using the non-near-field communications antenna.

19. The ring device defined in claim 18 wherein the near-field communications reader is configured to use the coil to obtain near-field communications tag information from a near-field communications tag and wherein the information transmitted wirelessly to the companion device comprises the near-field communications tag information.

20. A ring device operable with a companion device, comprising:
a finger-ring housing having a finger-shaped opening;
a coil having turns that wrap around the finger-shaped opening;
near-field communications circuitry coupled to the coil; and
wireless communications circuitry including a non-near-field antenna configured to transmit wireless signals to the companion device, wherein the wireless signals comprise information received by the near-field communication circuitry.

21. The ring device defined in claim 20 wherein the coil comprises a printed circuit with metal traces forming the turns.

22. A ring device, comprising:
a finger-ring housing having a finger-shaped opening;
an accelerometer;
a coil having turns formed from metal traces on a printed circuit that loop around the finger-shaped opening;
a near-field communications reader configured to obtain tag information from a near-field communications tag using the coil;
a non-near-field communications antenna; and
wireless communications circuitry configured to transmit the tag information using the non-near-field communications antenna.

23. The ring device defined in claim 22 further comprising wireless power circuitry configured to receive wireless power using the coil, wherein the near-field communications reader is configured to obtain the tag information in response to output from the accelerometer.

* * * * *